US005087940A

United States Patent [19]
Altmann

[11] Patent Number: 5,087,940
[45] Date of Patent: Feb. 11, 1992

[54] CONTROL SYSTEM FOR DOCUMENT REPRODUCTION MACHINES

[75] Inventor: Conrad Altmann, Rochester, N.Y.

[73] Assignee: Eastman Kodak Company, Rochester, N.Y.

[21] Appl. No.: 571,479

[22] Filed: Aug. 23, 1990

[51] Int. Cl.5 .............................................. G03G 15/00
[52] U.S. Cl. ......................................... 355/204; 364/131; 455/66
[58] Field of Search ............................ 355/200, 204; 340/825.69, 825.72; 364/131, 132, 133, 138; 455/66–68; 358/401, 296

[56] References Cited

U.S. PATENT DOCUMENTS

| 3,836,887 | 9/1974 | Ueda et al. | 340/163 |
| 4,503,430 | 3/1985 | Hösel | 340/825.52 |
| 4,543,575 | 9/1985 | Liermann | 340/825.57 |
| 4,550,382 | 10/1985 | Federico et al. | 364/572 |
| 4,568,931 | 2/1986 | Biolley et al. | 340/825.57 |
| 4,590,963 | 5/1986 | Gardner et al. | 137/554 |
| 4,605,215 | 8/1986 | Hyltoft | 355/309 X |
| 4,887,312 | 12/1989 | Dannhaeuser | 455/607 |
| 4,970,553 | 11/1990 | Orlonski et al. | 355/200 |
| 4,975,926 | 12/1990 | Knapp | 455/611 X |
| 4,980,780 | 12/1990 | Tanaka | 358/401 |
| 4,980,814 | 12/1990 | Hosaka et al. | 355/204 X |

Primary Examiner—Joan H. Pendegrass
Attorney, Agent, or Firm—Milton S. Sales

[57] ABSTRACT

A reproduction apparatus machine control system adapted to transmit control information to a plurality of process subsystems without transmission lines uses two-way transmission of signals which are free to propagate between the process subsystems and a controller system without confinement to an electrical wire, cable, or optical fiber system. An enclosure surrounds the process subsystems and the controller system for preventing the leakage of transmitting signals to the area outside the enclosure, aiding the propagation of said signals within the enclosure, and substantially preventing the entrance of interference signals into the region surrounded by the enclosure.

16 Claims, 4 Drawing Sheets

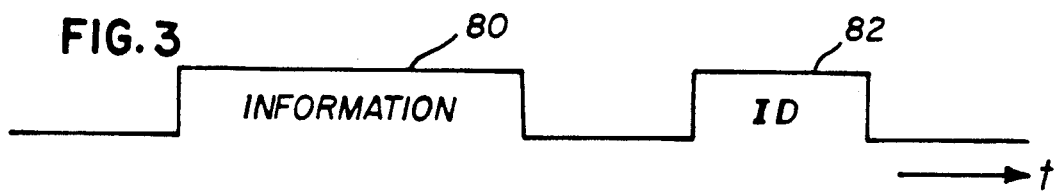
FIG. 3
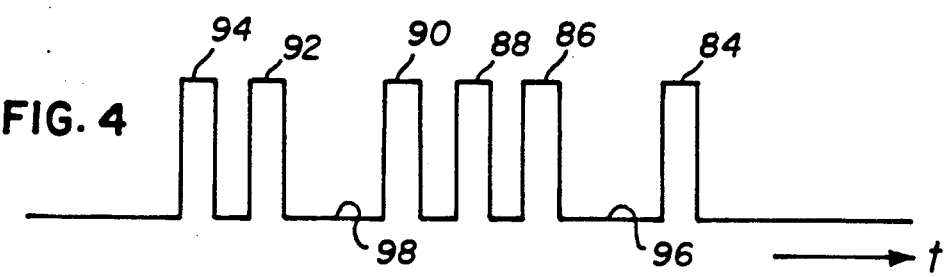
FIG. 4
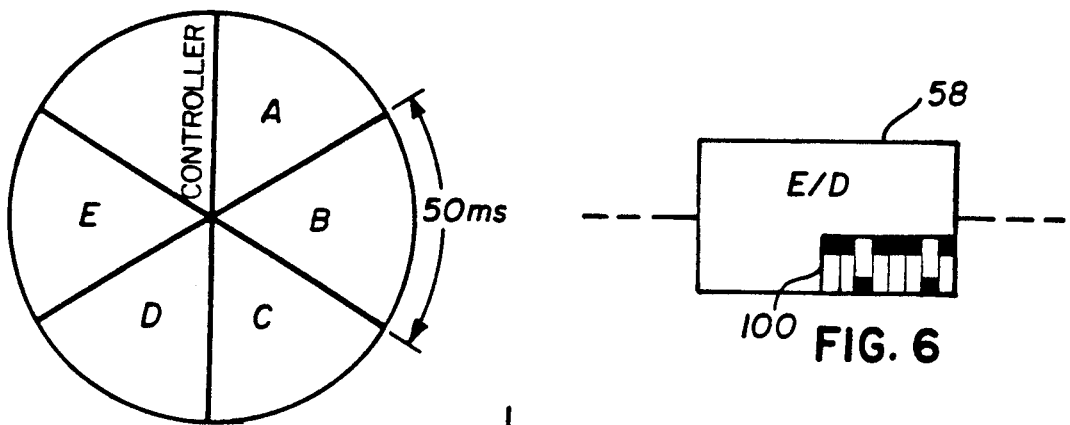
FIG. 5
FIG. 6
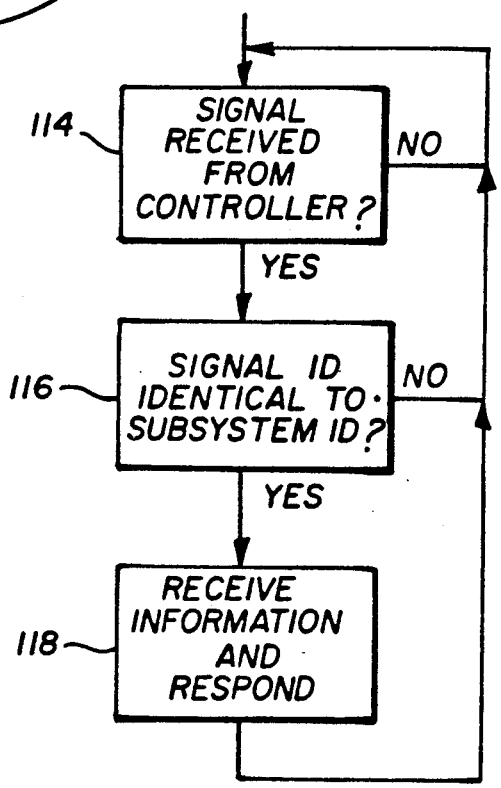
FIG. 8

CONTROL SYSTEM FOR DOCUMENT REPRODUCTION MACHINES

BACKGROUND OF THE INVENTION

1. Technical Field

This invention relates generally to document reproduction apparatus such as copiers, printers, and the like.

2. Background Art

Machine control systems for document reproduction apparatus are known in many forms, such as for example mechanical systems of levers, gears, cams, rollers, and/or belts to transmit signals required to sequence or time system functions. Mechanical systems can be noisy, inefficient, expensive, bulky, limited in transmission distance, and slow. Pneumatic and hydraulic systems which use hoses to transmit signals have the advantage of permitting functions spaced farther apart, but they still share many of the disadvantages of mechanical machine control systems.

More modern electrical or electronic machine control systems use various sensors, switches, motors, solenoids, and clutches interconnected by wires or other electrically conductive means. Electrical or electronic systems are generally quiet, cost effective, fast, and compact; and can control widely spaced apart functions. However, the wires conducting the signals take up space and can be transmitters and receivers of electromagnetic interference (EMI).

One of the latest advances in machine control is the use of electro-optical systems which employ fiber optic light conductors to transmit signals to and from the functional elements in the system. While light conductors are very fast, transmit large amounts of control information, and are immune to electromagnetic interference, their application is limited because the conductors are costly and require routing in areas where space may be at a premium.

DISCLOSURE OF INVENTION

It is an object of the present invention to provide a reproduction apparatus machine control system which is compact, able to transmit large amounts of control information, is very fast, and does not require transmission lines.

It is another object of the present invention to reduce the number of connections made to separate subsystems within a shielding enclosure of an electrophotographic device, thus permitting the subsystems to be installed and removed more easily and reducing the amount of wiring and cabling which must be routed throughout the enclosure.

According to these and other objects, apparatus with a plurality of process subsystems for producing hardcopy outputs includes a controller system for coordinating the operation of the process subsystems; controller signal connecting means associated with the controller system and utilizing two-way transmitting and receiving signals for controlling the process subsystems; subsystem signal connecting means associated with the process subsystems and utilizing at least one-way transmitting or receiving signals which are free to propagate between the process subsystems and the controller system without confinement to an electrical wire, cable, or optical fiber system; means for identifying the source of a signal sent to the controller system from a particular process subsystem; and an enclosure surrounding the process subsystems and the controller system for preventing the leakage of transmitting signals to the area outside the enclosure, aiding the propagation of said signals within the enclosure, and substantially preventing the entrance of interference signals into the region surrounded by the enclosure.

According to a preferred embodiment of the present invention, each subsystem is in modular form and is replaceable in the apparatus with another similar subsystem without the need to make hard electrical or optical connections to any signal connecting means. A switching device may be included in the process subsystem, and be settable to identify a characteristic of the subsystem. The signal connecting means of at least one subsystem may utilize two-way transmitting and receiving signals for communication with the controller system, and the transmitting and receiving signals may use a carrier frequency within the frequency spectrum of at least one of sound, radio, and light waves. A signal director may be provided within the enclosure to improve the signal path between various signal connecting means. Means may also be provided for priority servicing signals from predetermined subsystems.

The invention, and its objects and advantages, will become more apparent in the detailed description of the preferred embodiments presented below.

BRIEF DESCRIPTION OF THE DRAWINGS

Further advantages and uses of this invention will become more apparent when considered in view of the following detailed description and drawings, in which:

FIG 3 is a timing diagram for a typical data signal;

FIG. 4 is a timing diagram of a typical ID signal;

FIG. 5 is a diagram which illustrates possible subsystem transmission sequences;

FIG. 6 illustrates a switching means associated with an encoder/decoder;

FIG. 8 is a flow chart of communication functions performed by a typical subsystem.

DESCRIPTION OF THE PREFERRED EMBODIMENTS

Figure 1:
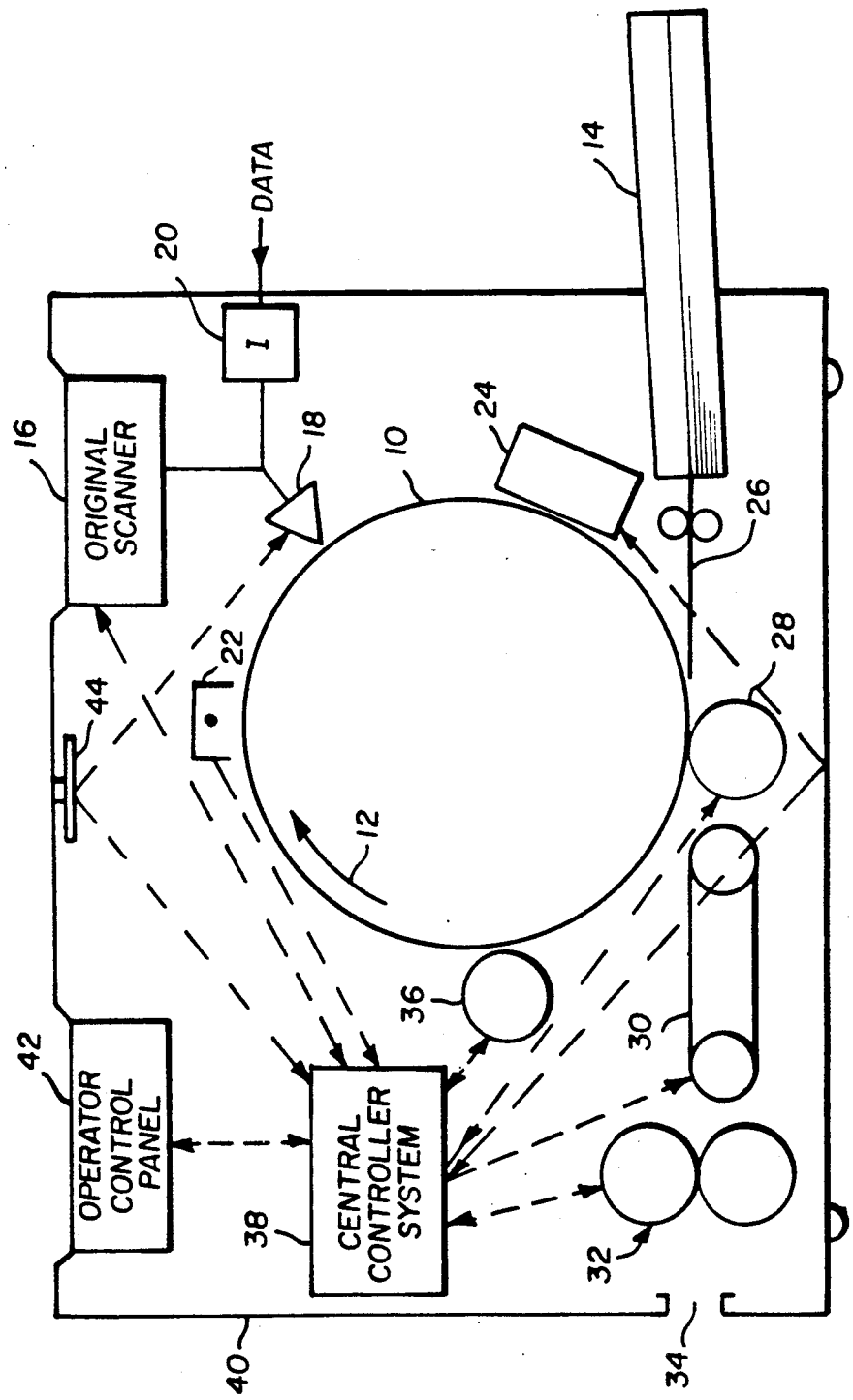
FIG. 1 is a schematic view of a copier/printer which uses the invention.

Throughout the following description, similar reference characters refer to similar elements or members in all of the figures of the drawings.

Referring to the drawings, and to FIG. 1 in particular, there is shown a schematic view of a copier/printer using the teachings of the invention. According to FIG. 1, the hardcopy producing apparatus includes a photosensitive member 10 which rotates in direction 12 while producing an output sheet delivered from a tray 14. The apparatus can be used as both a copier and an electronic printer. When being used as a copier, the original document is placed upon a device 16 where the original is viewed and data is transferred to an exposure device 18. When the apparatus is being used as a printer, electrical data signals are connected to an interface device 20 which transfers these signals eventually to the exposure device 18. Although not shown in FIG. 1, the input data, whether from scanner 16 or from interface 20, may be stored in a buffer or memory system in conventional or compressed form before being supplied, with or without further processing, to the exposure device 18. The exposure device can be any of several types conventionally used for this process, including laser scanning systems and light emitting diode (LED) printheads. It is also within the contemplation of the invention that an optical exposure system which optically forms an image of the original upon photosensitive member 10 can be used with the other novel elements of the invention.

The hardcopy outputs are produced by a conventional electrophotographic process which uses dedicated process stations located at different positions around photosensitive member 10. A charging station or subsystem 22 places a charge on photosensitive member 10 which is selectively exposed by exposure device 18. This selective exposure produces a latent image on photosensitive member 10 which is developed by toner applied by a development station or subsystem 24. The developed image is then transferred to a flat sheet 26 with the aid of a transfer roller 28 which constitutes a portion of a transfer station or subsystem.

The sheet containing the toned image is conveyed by a conveyor subsystem 30 to a fuser station 32 where the toned image is fused onto the sheet. After fusing, the hardcopy output exits the apparatus through an opening 34. Residual toner and/or carrier particles on photosensitive member 10 are removed by a cleaning station or subsystem 36. Although other stations or subsystems and devices may be necessary to provide a completely functional copier or printer, the subsystems shown are illustrative of those which can advantageously use the teachings of this invention. It is to be understood that other subsystems or devices in the apparatus may also communicate with a central controller system 38, as will be described herein, without departing from the teachings of the invention.

In normal operation, all of the process subsystems need to be coordinated with at least one of the other subsystems so that the image is created, toned, and transferred properly at the appropriate times. Other devices, such as motors, solenoids, sensors, and like devices, which control or move some devices in the apparatus, must be coordinated with the process substations. Central controller system 38, according to this invention, maintains the required timing coordination between these devices and subsystems. The central controller system communicates between the subsystems by means of signals propagated within an enclosure 40 which surrounds the apparatus components. The signals propagate freely between controller system 38 and the subsystems by travelling within the space enclosed by enclosure 40, as indicated by the dashed lines shown in FIG. 1. Such signals are not confined to any electrical wire, cable, or optical fiber system which routes the signals directly to the subsystem. When the subsystem is located at a remote point from controller system 38, reflection off of other components, or from the interior of enclosure 40, can aid in the establishment of communications between the controller system and the subsystem.

The transmitted and received signals can have a carrier frequency which is in the frequency range or spectrum of audio, including audible, subaudible, and ultrasonic signals, electrical radio signals, and light signals, including visual, infrared, and ultraviolet light signals. The signals between a specific subsystem and controller system 38 may be of a particular frequency or characteristic so that it can be distinguished from other signals within enclosure 40. As an alternative, the signals which communicate with the various subsystems can have the same carrier frequency and be coded with a special identification which indicates which subsystem the signal is intended to communicate with. In any event, the intelligence or information data on the signal may be applied thereto by a modulation process which alters the frequency, amplitude, or other characteristic of the transmitted signal.

An operator control panel 42, shown in FIG. 1, also communicates with central controller system 38. In some cases, switches or key input devices on operator control panel 42 merely transmit to controller system 38 and are not required to receive any signals therefrom. On the other hand, some devices in control panel 42, such as a display or indicator, may only be required to receive signals from controller system 38.

A director or deflector 44 may be used in enclosure 40 to aid in the propagation of signals between a remote subsystem, such as exposure device 18, and controller system 38. For example, director 44 could be a mirror if visual signals are used for communications. However, enclosure 40 itself would act as a suitable deflecting device in many instances where the enclosure is made of metal and the signals consist of radio or audio sound waves. When light frequency waves are used, it may be advantageous to coat the inside of enclosure 40 with a highly reflective or silver surface to improve the propagation between remote members in the apparatus. If the signal frequency is close to the frequency of exposure light, synchronization may be used so that interference does not occur from the exposure source. That is, no signals would be sent when the exposure subsystem is operating. Such would be important if a high intensity light is used for exposure and light frequencies are used for the signals.

Regardless of the type of signals used, this type of interconnection and communication between controller system 38 and the subsystems conveniently provides for making the subsystems modular and replaceable with similar subsystems without the necessity of connecting various signal cables and lines to the replaced subsystems. In other words, the number of cables connected through hard connections to the subsystems is reduced by the teachings of this invention and promotes the replacement of components and subsystems in the apparatus. Enclosure 40 also prevents interfering signals from entering the communicating area and prevents leakage of signals from the communicating area.

Figure 2:
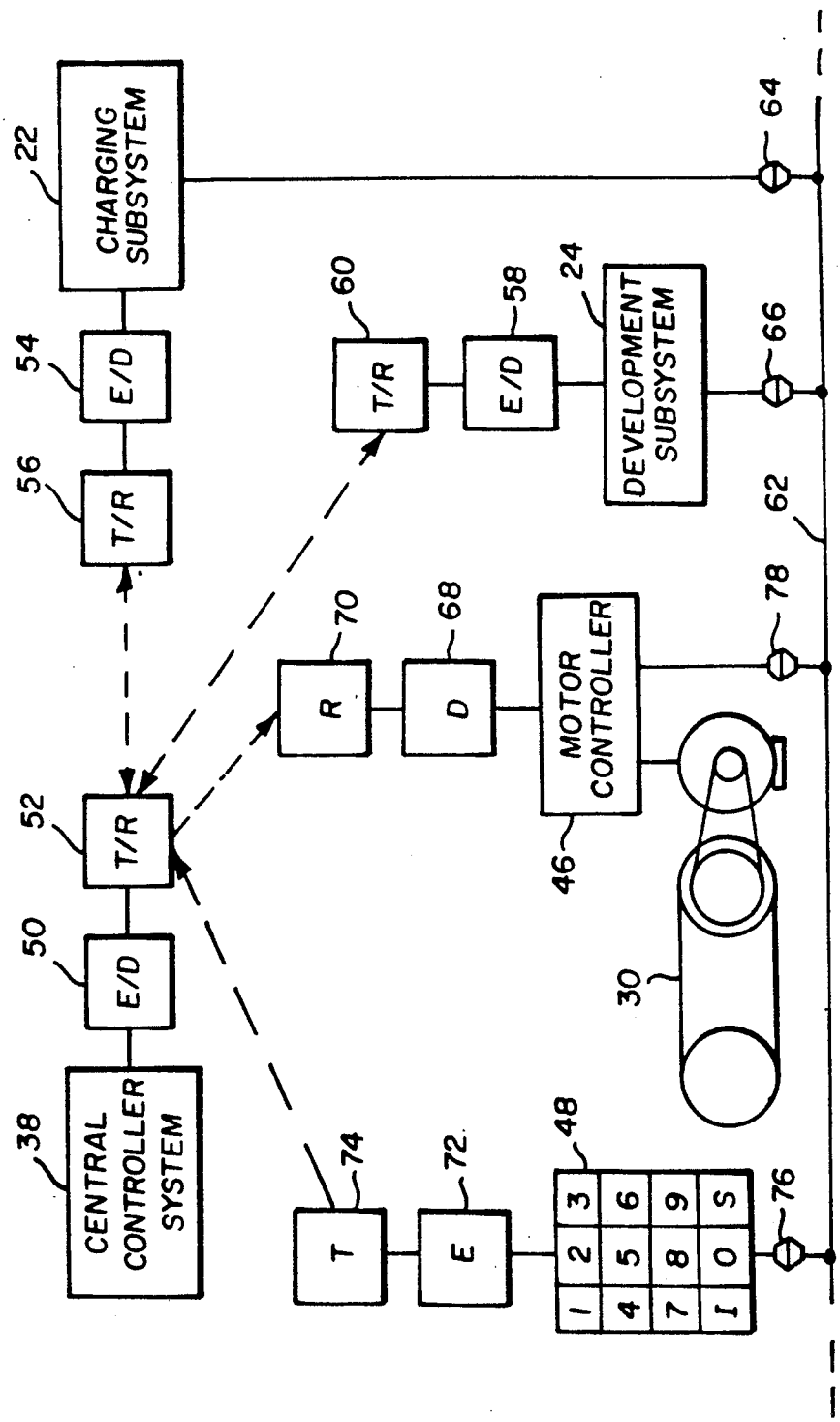
FIG. 2 is a block diagram illustrating signal communication between representative subsystems of apparatus shown in FIG. 1.

FIG. 2 is a block diagram illustrating the use of central controller system 38 with a few representative subsystems normally enclosed within such apparatus. In this specific example, charging subsystem 22 and development subsystem 24 are illustrated. In addition, typical examples where information needs to be transferred in just one direction are indicated by a motor controller 46 which receives information and by a key input pad 48 which transmits information to controller system 38.

Controller system 38 is connected to an encoder/decoder 50 and the transmitter/receiver 52 which, together, provide the signal connecting means necessary to communicate with the other subsystems. Encoder/decoder 50 allows the transmitted signal to be encoded or identified for a specific subsystem. The decoding portion of encoder/decoder 50 permits controller system 38 to identify signals received from particular subsystems which have encoded their signals with a specific identification signal. To complete the communication path, charging subsystem 22 is connected to an encoder/decoder 54 and a transmitter/receiver 56, and development subsystem 24 is connected to an encoder/decoder 58 and a transmitter/receiver 60.

It is to be understood that the signals communicated to the subsystems are for the purpose of controlling the operation of the subsystems to appropriately synchronize the overall electrophotographic process. The power to operate the subsystems must be provided by separate electrical connections since the electrical energy provided by the communicating signals is negligible. Thus, charging subsystem 22 is connected to a power buss 62 by a connector 64, and a connector 66 connects power buss 62 to development subsystem 24.

Subsystems 46 and 48, which pertain to conveyor 30 and operator control panel 42 shown in FIG. 1, represent subsystems which require only one-way communication with controller system 38. For that purpose, motor controller 46 is connected through a decoder 68 to a receiver 70, and a key input pad 48 is connected through an encoder 72 to a transmitter 74. The devices are connected to power buss 62 by connectors 76 and 78. Therefore, a manual instruction to the apparatus entered on keypad 48 is encoded by encoder 72 and transmitted by transmitter 74 to central controller system 38. This allows for a manual instruction to be used as information for producing the hardcopy output, such as the number of copies, the color in which the copy is to be produced, or the magnification of the produced copy.

FIG. 3 is a timing diagram for a typical data signal which is conveyed between a process subsystem and the controller system, in either direction. The beginning of the signal includes an identification, or ID, portion 82 which is descriptive of the origin or destination of the signal. This information can be modulated onto the carrier frequency of the signal. In the case of a signal from controller system 38 to one of the subsystems, the ID would indicate the identity of the subsystem, and only that subsystem would respond further to information 80 contained in the signal. Other subsystems receiving this signal but not having the same ID portion 82 would disregard the information 80. When the signal is being conveyed from the subsystem to the controller system, ID portion 82 represents the source of the signal so that controller system 38 knows where the information originated. ID portion 82 of the signal may also indicate, by additional data, whether the overall signal is being transmitted from controller system 38 or from a process subsystem to controller system 38.

FIG. 4 is a timing diagram of a typical ID signal indicating one method by which the identification portion can be placed upon the carrier signal. In this specific embodiment, the identification is provided by a binary coding on the transmitted signal. Eight binary bits are used to distinguish the various subsystems, thereby providing for a total of 256 different subsystems. The presence of signal pulses 84, 86, 88, 90, 92 and 94 each correspond to a binary "1" in the identification, and the absence of pulses at positions 96 and 98 each correspond to a binary "0". This provides a decimal equivalent of 221 to identify the particular process subsystem. It is emphasized that a smaller number of bits may be used to identify the process subsystems when it is not necessary to be able to identify as many as 256 different subsystems. The pulses, such as pulse 84, can be distinguished by amplitude modulation on a carrier signal, or by other forms of modulation. In accordance with well known modulating/demodulating (modem) techniques, two different frequencies (carrier or modulating) may be used to indicate, at a particular instant of time, whether the ID signal consists of a pulse or the absence of a pulse.

With this type of communication system wherein a central controller system is coordinating the entire process and thereby receiving and transmitting signals from various subsystems within the apparatus, there is a possibility that two subsystems may attempt to transmit to controller system 38 at substantially the same instant of time. There are various ways known which can be used to prevent packets of information from conflicting or interfering with similar packets of information. In this specific embodiment of the invention, the controller assigns specific time intervals for each subsystem during which it may transmit to the controller system. For example, as shown in FIG. 5, a subsystem "B" is allocated a 50 millisecond interval during which it may transmit to the controller system. The other indicated subsystems have the same amount of time and the controller system itself is allocated its own slot for communicating to any of the subsystems. Thus, a total of five subsystems may be controlled without interference by allocating specific 50 millisecond intervals during a 300 millisecond time period for communication.

This technique prevents instantaneous transmission from a subsystem to the controller and requires that it wait until its respective time slot in the 300 millisecond cycle occurs. However, in most process control applications in electrophotographic apparatus, such a sequencing of control signals is well within the limits of the machine's ability to maintain proper process control. It is emphasized that different numbers of process stations within the cycle, and a different dedicated interval period may be used without departing from the teachings of the invention. The interval allocated to the controller system may also be used by the controller to update or synchronize the timing devices in the subsystems so that their intervals, as measured by their particular subsystem controller, are substantially equal to the time intervals observed by controller system 38. Other forms of signal collision avoidance may be used within the contemplation of the invention.

FIG. 6 illustrates a switching means associated with an encoder/decoder 58 which includes a switching device 100 which may be set to properly identify the associated subsystem. In other words, switching device 100 can be an eight-position dip switch which can be properly set to identify the subsystem to controller system 38. The switch setting shown in FIG. 6 corresponds to the ID signal shown in FIG. 4. Along with identifying the particular subsystem, the ID signal can also indicate particular characteristics of the subsystem which may be of interest to the controller system. For example, the settings on switch 100 may also indicate, in the case where encoder/decoder 58 is associated with a development subsystem, the color of toner installed in the modular toner development subsystem. Therefore, when a particular development subsystem is installed in the apparatus, the controller system knows, from the ID signal, what color is in the development station.

Figure 7:
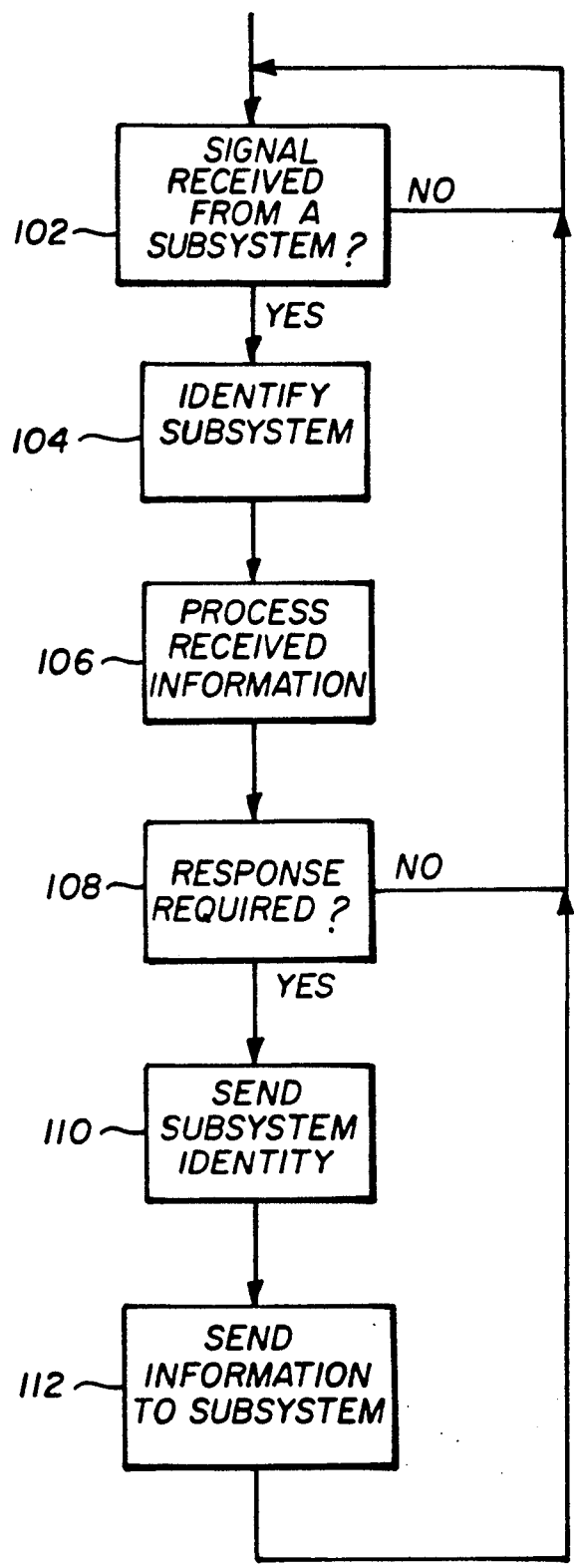
FIG. 7 is a flow chart of communication functions performed by the central controller system.

FIG. 7 is a flow chart of functions performed by central controller system 38 shown in FIG. 1. These functions are typical of a computer algorithm used to control the system. According to a block 102, the controller system monitors the received signal to see if a signal has been received from a subsystem. If not, process flow is diverted back to the input of block 102 to form a loop which continues to look for a signal from a subsystem. When a signal from a subsystem is received, process flow continues to block 104 which identifies the subsystem from the ID signal. Next, according to a block 106, the received information in the signal is processed and block 108 determines whether a response is necessary. If a transmitted signal to a subsystem is not necessary, process flow returns to original block 102 to monitor for other signals from a subsystem. If a response is required, process flow continues to a block 110 where an identity signal, or ID signal, is transmitted along with the appropriate information content of the signal to the appropriate subsystem, as indicated in block 112. The flow chart of FIG. 7 does not illustrate any origination of signals by the controller system itself. In a fully operational system, this may be desirable and would be an easily accomplished modification to the flow chart shown in FIG. 7.

FIG. 8 is a flow chart of functions performed by a typical subsystem. These functions are typical of a computer algorithm which may be used to control the subsystem. According to FIG. 8, the communication path is monitored to see if a signal is received from the controller, as indicated in a block 114. If no signal has been received, process control loops back upon itself to continue looking for a received signal. Once a signal is received, process flow is directed to a block 116 where the ID of the signal is analyzed to determine if it is identical to the ID of the receiving subsystem. If not, the subsystem determines that the signal is not intended for it and process control is diverted back to block 114. In the case where the ID's match, the information content of the signal is appropriately responded to, as indicated in a block 118. After the response, the subsystem returns to block 114 to monitor for another received signal.

The apparatus of this invention allows for a reduction in the number of connections made to separate subsystems within a shielding enclosure of an electrophotographic device. This permits the subsystems to be installed and removed more easily, and reduces the amount of wiring and cabling which must be routed throughout the enclosure.

It is emphasized that numerous changes may be made in the above-described system without departing from the teachings of the invention. It is intended that all of the matter contained in the foregoing description, or shown in the accompanying drawings, shall be interpreted as illustrative rather than limiting.

I claim as my invention:

1. Apparatus for producing hardcopy outputs on receiver sheets from information delivered to the apparatus by at least one of electrical signals, visual originals, and manual instruction, said apparatus comprising:
    a plurality of process subsystems;
    a controller system for coordinating the operation of the process subsystems, one with another;
    controller signal connecting means associated with the controller system, said controller signal connecting means utilizing two-way transmitting and receiving signals for controlling the process subsystems;
    subsystem signal connecting means associated with the process subsystems, said subsystem signal connecting means utilizing at least one-way transmitting or receiving signals for connection with the controller system;
    said one-way and two-way signals being free to propagate between the process subsystem and the controller system without confinement to a defined electrical path or optical fiber system;
    means for identifying the source of a signal sent to the controller system from a particular process subsystem; and
    an enclosure surrounding the process subsystems and the controller system, said enclosure substantially preventing the leakage of transmitting signals to the area outside the enclosure, aiding the propagation of said signals within the enclosure, and substantially preventing the entrance of interference signals into the region surrounded by the enclosure.

2. The hardcopy producing apparatus of claim 1 wherein each subsystem is in modular form and is replaceable in the apparatus with another similar subsystem.

3. The hardcopy producing apparatus of claim 2 wherein the subsystem may be replaced without the need to make hard electrical or optical connections to any signal connecting means.

4. The hardcopy producing apparatus of claim 2 wherein a switching device is included in a process subsystem, said switching device being settable to identify a characteristic of the subsystem.

5. The hardcopy producing apparatus of claim 1 wherein a subsystem includes motors, solenoids, or like devices which require their signal connecting means to only receive signals.

6. The hardcopy producing apparatus of claim 1 wherein a subsystem includes sensors, input means, or like devices which require their signal connecting means to only transmit signals.

7. The hardcopy producing apparatus of claim 1 wherein the signal connecting means of at least one subsystem utilizes two-way transmitting and receiving signals for communication with the controller system.

8. The hardcopy producing apparatus of claim 1 wherein the transmitting and receiving signals are characterized by the use of a carrier frequency within the frequency spectrum of at least one of sound, radio, and light waves.

9. The hardcopy producing apparatus of claim 1 wherein a signal director is used within the enclosure to improve the signal path between various signal connecting means.

10. The hardcopy producing apparatus of claim 1 wherein at least one of the subsystem signal connecting means includes an identification means for determining when a received signal is directed to that particular subsystem.

11. The hardcopy producing apparatus of claim 10 wherein the identification means is responsive to a unique code signal modulated in the signal directed to that particular subsystem.

12. The hardcopy producing apparatus of claim 1 wherein the controller system includes means for providing priority servicing of signals from predetermined subsystems.

13. Apparatus for producing hardcopy outputs on receiver sheets from information delivered to the apparatus by at least one of electrical signals, visual originals, and manual instruction, said apparatus comprising:
    a plurality of process subsystems;

a controller system for coordinating the operation of the process subsystems, one with another;

controller signal connecting means associated with the controller system, said controller signal connecting means utilizing two-way transmitting and receiving signals for controlling the process subsystems;

subsystem signal connecting means associated with the process subsystems, said subsystem signal connecting means utilizing at least one-way transmitting or receiving signals for connection with the controller system;

said one-way and two-way signals being free to propagate between the process subsystems and the controller system without confinement to an electrical wire, cable, or optical fiber system;

means for identifying the source of a signal sent to the controller system from a particular process subsystem; and an enclosure surrounding the process subsystems and the controller system, said enclosure substantially preventing the leakage of transmitting signals to the area outside the enclosure, aiding the propagation of said signals within the enclosure, and substantially preventing the entrance of interference signals into the region surrounded by the enclosure, wherein at least some of the transmitting and receiving signals connecting the controller and process subsystems are synchronized with an exposure light source within the apparatus to prevent the signals from receiving interference from the light source.

14. Apparatus for producing hardcopy outputs on a sheet medium from information delivered to the apparatus by way of electrical signals, visual originals, or by manual instruction, said apparatus comprising:

a plurality of modular process subsystems each requiring coordinated operation with at least one other subsystem in the apparatus, said subsystems being replaceable with a similar subsystem without the need to make any hard signal connections;

a central controller system for coordinating the operation of the subsystems with each other;

controller signal connecting means associated with the controller system, said signal connecting means utilizing two-way transmitting and receiving signals for controlling the subsystems;

subsystem signal connecting means associated with the process subsystems, said subsystem signal connecting means utilizing at least one-way receiving signals for connection with the controller system, said subsystem signal connecting means further having an identification means for determining when a received signal is directed to that particular subsystem;

means for identifying the source of a signal sent to the controller system from a particular subsystem; and an enclosure surrounding the process subsystems and the central controller system, said enclosure (1) preventing the leakage of substantially any transmitting signals to the area outside the enclosure, (2) preventing the entrance of substantially any interference signals into the region surrounded by the enclosure, and (3) allowing propagation of said one-way and two-way signals between the process subsystems and the controller system in the open spaces within the enclosure.

15. The hardcopy producing apparatus of claim 14 wherein the transmitting and receiving signals use a carrier frequency in the frequency spectrum occupied by either infrared or ultrasonic signals.

16. Apparatus for producing hardcopy outputs on a sheet medium by using an electrostatographic process employing at least charging, exposing, developing, and transferring process functions, said apparatus comprising:

a plurality of process subsystems each requiring coordinated operation with at least one other subsystem in the apparatus;

a controller system for coordinating the operation of the subsystems with each other;

an enclosure surrounding the process subsystems and the controller system;

means for communicating between the process subsystems and the controller system, said communicating means using radiated signals which propagate in substantially all directions throughout the enclosure to link the controller system and the subsystems together; and means for encoding and decoding identification signals on the communication signals linking the controller system and the process subsystems.

* * * * *